United States Patent Office 3,843,435
Patented Oct. 22, 1974

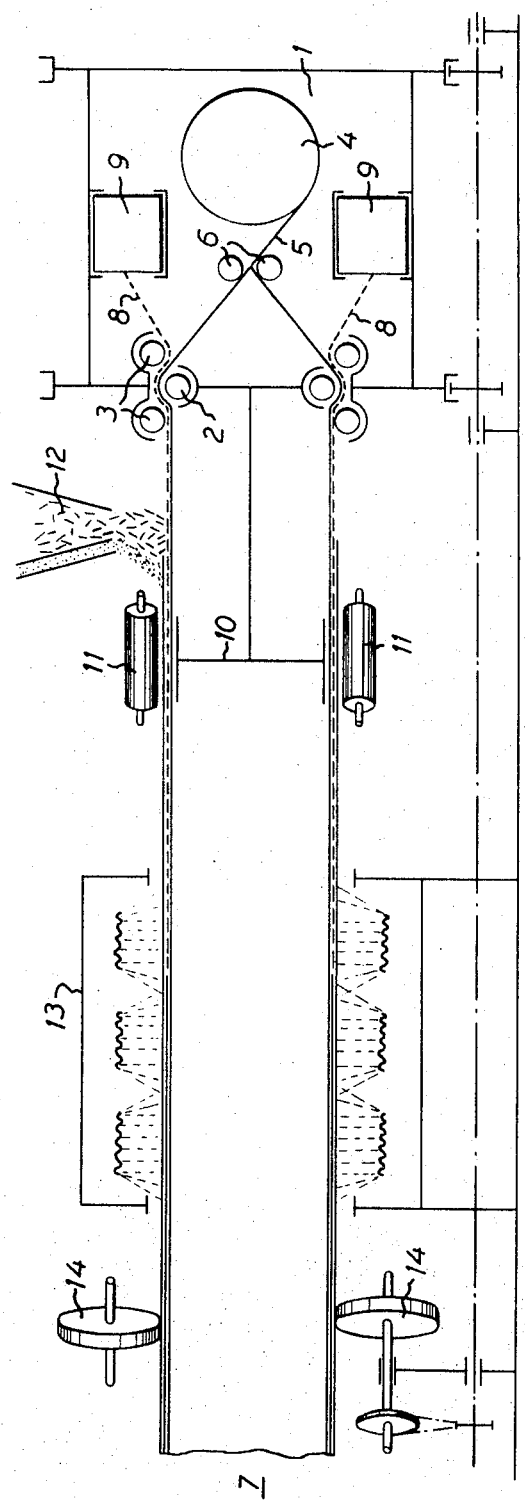

3,843,435
PROCESSES AND APPARATUSES FOR CONTINUOUSLY MANUFACTURING TUBULAR BODIES OF REINFORCED SYNTHETIC PLASTIC
Torsten Erik Theodor Strom, Klippan, Sweden, assignor to AB Broderna Ottosson & Co., Klippan, Sweden
Filed June 19, 1972, Ser. No. 263,825
Int. Cl. B32b 1/08
U.S. Cl. 156—143                                  2 Claims

ABSTRACT OF THE DISCLOSURE

In a process and apparatus for continuously manufacturing a tubular body a flexible hose is rotated and pulled over an annulus to expand the hose into cylindrical shape and from the annulus through a curing zone and randomly oriented fibers and a curable plastic are deposited on the rotating and advancing hose between the annulus and the curing zone as a layer which is then cured in the curing zone.

---

This invention relates to a process and an apparatus for continuously manufacturing tubular bodies of reinforced synthetic plastic.

It has already been suggested to manufacture fiber reinforced pipes of synthetic plastic, in which procedures a sheeting was continuously wound onto a rotating core while exploiting the rotation of the core and after that a fibre reinforcement was continuously wound onto the rotating core on the outer side of the sheeting, said fiber reinforcement being impregnated with a curable plastic before, during or after the winding operation, whereupon the pipe was pulled off the core and continuously passed through a curing zone by pulling means acting upon the cured end of the pipe and continuously pulling the pipe with the inner sheeting in the axial direction, while the pipe and the core are being rotated.

According to the present invention, it is suggested instead of winding the core to use a hose of synthetic plastic which is expanded over an annular mandrel and which is kept in expanded state by pulling, axially oriented glass-fibers preferably impregnated with a curable solution of plastic being simultaneously applied to the hose, and after that chopped roving and resin are applied, which by suitable pressure means are pressed against the expanded hose, whereupon the hose with the material applied thereto is conducted through a curing zone while being continuously pulled for the manufacture of pipes of optional length.

The main object of the invention is to provide a process of continuously manufacturing tubular bodies by application of at least one randomly oriented fiber reinforcement and a curable plastic to a hose of plastic or like material and, according to the invention, the hose is expanded over an annular member into cylindrical shape and is caused by axial stretching to retain said cylindrical shape, randomly oriented fibers and a curable plastic are applied to the hose from at least one stationary nozzle during rotation and continuous advance of the hose, and, optionally after calibration of the pipe during the operation for rolling the reinforcement and the plastic into the pipe, the resulting pipe is cured.

The invention is more fully described hereinbelow with reference to the accompanying diagrammatic drawing which shows the principle of an apparatus for manufacturing reinforced pipes of plastic built up on a core comprising an expanded hose of plastic.

The process according to the invention is substantially based upon the feature that both the pipe and the associated feed means and calibration unit rotate about the same axis. The feed means 1 includes a ring 2 which is carried and guided by supporting rollers 3. The feed means 1 includes a reel 4 on which is wound a hose 5 of plastic sheeting. This hose is conducted from the reel to the ring 2 by two rollers 6 and is then expanded over the ring 2 so that the hose assumes a round shape. The hose is pulled through the apparatus and attached to a fastening 7 at the exit side. Glass roving 8 is advanced from a supply 9 between the ring 2 and the supporting rollers 3 against the outer side of the plastic hose. As a result, there is formed a longitudinal outer reinforcement on the hose. During rotation of the hose chopped roving is applied to the hose from distributing nozzles 12 together with liquid curable plastic, which material is rolled into the hose by rolls 11 while the enclosed air is simultaneously squeezed out, the rolling pressure being increased by the provision of an inner annular member 10 in the region of the rolls 11. This treatment will provide a homogeneous mass of glass fibers and plastic on the outer side of the hose of plastic.

After this treatment the pipe is conducted under continued rotation and pull through a curing furnace 13 for curing the applied plastic. After exiting from the curing furnace the finished cured pipe is further advanced by rollers 14 and cut into desired lengths.

During manufacture the movement of the pipe advancing mechanism is synchronized with that of the feed means. Moreover, the hose of sheeting together with the axially applied roving filaments is kept under tension since the rollers 14 draw out and stretch the plastic hose from the ring 2.

What I claim and desire to secure by Letters Patent is:

1. A process of continuously manufacturing a tubular body, comprising the steps of advancing a flexible hose from a supply, in which said hose is rolled in flat condition into a roll, by pulling over a torus-shaped annular member to expand it into cylindrical shape and to hold it in said shape over a distance beyond said annular member, applying rollers to the exterior surface of said advancing hose within the range of said annular member to support said annular member and keep it substantially axially immovable within said hose, rotating said supply, said hose and said rollers around the axis of said annular member during said advancing, applying randomly oriented fibers and a curable plastic to the exterior surface of said advancing and rotating hose within an application zone beyond said annular member, and curing the applied plastic on said advancing and rotating hose within a curing zone following the application zone.

2. A process of continuously manufacturing a tubular body, comprising the steps of advancing a flexible hose from a hose supply, in which said hose is rolled in flat condition into a roll, by pulling over a torus-shaped annular member to expand it into cylindrical shape and to hold it in said shape over a distance beyond said annular member, advancing reinforcing rovings from roving supplies together with said hose, applying said rovings to the exterior surface of said advancing hose within the range of said annular member by means of rollers to locate said rovings axially along the exterior surface of said hose and to support said annular member and keep it substantially axially immovable within said hose, rotating said hose supply, said roving supplies, said hose, said rovings, and said rollers around the axis of said annular member during said advancing, applying randomly oriented fibers and a curable plastic to the exterior surface of said advancing and rotating hose and said rovings within an application zone beyond said annular member, and curing the applied plastic within a curing zone following the application zone.

(References on following page)

References Cited

UNITED STATES PATENTS

| | | | |
|---|---|---|---|
| 3,407,107 | 10/1968 | Skoggard et al. | 156—432 |
| 3,792,847 | 2/1974 | Amoser | 264—210 R |
| 3,790,651 | 2/1974 | Meitinger | 264—209 |
| 3,290,198 | 12/1966 | Lux et al. | 264—209 |
| 3,480,493 | 11/1969 | Bauer et al. | 156—278 |
| 3,676,258 | 7/1972 | Jackson | 156—279 |
| 3,436,442 | 4/1969 | Saks | 156—279 |

FOREIGN PATENTS 596,310  4/1960  Canada  156—279

CHARLES E. VAN HORN, Primary Examiner

F. FRISENDA, JR., Assistant Examiner

U.S. Cl. X.R.

156—165, 279; 264—209, 210 R